US012573166B1

(12) United States Patent
Wu et al.

(10) Patent No.: US 12,573,166 B1
(45) Date of Patent: Mar. 10, 2026

(54) GENERATIVE MODELING OF THREE-DIMENSIONAL OBJECT WITH LAYERED DEPTH IMAGES

(71) Applicant: Amazon Technologies, Inc., Seattle, WA (US)

(72) Inventors: Haoyu Wu, Huntington Station, NY (US); Sunil Sharadchandra Hadap, Dublin, CA (US); Meher Gitika Karumuri, Santa Clara, CA (US); Seungbae Bang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 18/528,597

(22) Filed: Dec. 4, 2023

(51) Int. Cl.
| | |
|---|---|
| *G06T 19/20* | (2011.01) |
| *G06T 5/50* | (2006.01) |
| *G06T 5/70* | (2024.01) |
| *G06T 15/04* | (2011.01) |
| *G06T 15/20* | (2011.01) |
| *G06T 17/20* | (2006.01) |

(52) U.S. Cl.
CPC ............... *G06T 19/20* (2013.01); *G06T 5/50* (2013.01); *G06T 5/70* (2024.01); *G06T 15/04* (2013.01); *G06T 15/205* (2013.01); *G06T 17/20* (2013.01); *G06T 2207/10028* (2013.01); *G06T 2207/20081* (2013.01); *G06T 2207/20084* (2013.01); *G06T 2207/20221* (2013.01); *G06T 2210/56* (2013.01); *G06T 2219/2016* (2013.01)

(58) Field of Classification Search
CPC .. G06T 7/174; G06T 3/18; G06T 7/30; G06T 7/11; G06T 17/205; G06T 3/4038; G06T 7/248; G06T 2207/20021; G06T 2207/10028

USPC .......................................................... 345/418
See application file for complete search history.

(56) References Cited

U.S. PATENT DOCUMENTS

| | | | |
|---|---|---|---|
| 2021/0004933 A1* | 1/2021 | Wong | G06T 7/174 |
| 2022/0414834 A1* | 12/2022 | Du | G06T 7/13 |

(Continued)

OTHER PUBLICATIONS

Lunscher N, Zelek J. Deep learning whole body point cloud scans from a single depth map. InProceedings of the IEEE Conference on Computer Vision and Pattern Recognition Workshops 2018 (pp. 1095-1102).*

(Continued)

*Primary Examiner* — Phu K Nguyen
(74) *Attorney, Agent, or Firm* — Knobbe, Martens, Olson & Bear, LLP

(57) ABSTRACT

The system generates a three-dimensional model with layered depth images based on an input two-dimensional image. For training, layered depth images are derived from existing three-dimensional models. The system trains a machine learning model to predict multiple layered depth images from an input image of an object. The system compares the generated, multiple layered depth images to the derived layered depth images for the object to update the machine learning model during training. At inference time, the system receives an input image for an object. The system applies the machine learning model to the input image to output predicted layered depth images. The system generates a three-dimensional model from the predicted layered depth images.

18 Claims, 11 Drawing Sheets

(56) References Cited

U.S. PATENT DOCUMENTS

| | | | |
|---|---|---|---|
| 2023/0072293 A1* | 3/2023 | Koh | G06T 7/10 |
| 2024/0249422 A1* | 7/2024 | Jampani | G06T 5/77 |

OTHER PUBLICATIONS

Jampani V, Chang H, Sargent K, Kar A, Tucker R, Krainin M, Kaeser D, Freeman WT, Salesin D, Curless B, Liu C. Slide: Single image 3d photography with soft layering and depth-aware inpainting. InProceedings of the IEEE/CVF International Conference on Computer Vision 2021 (pp. 12518-12527).*

Dhamo H, Tateno K, Laina I, Navab N, Tombari F. Peeking behind objects: Layered depth prediction from a single image. Pattern Recognition Letters. Jul. 1, 2019;125:333-40.*

Fan H, Su H, Guibas LJ. A point set generation network for 3d object reconstruction from a single image. InProceedings of the IEEE conference on computer vision and pattern recognition 2017 (pp. 605-613).*

Li Y, Liu D, Li H, Li L, Wu F, Zhang H, Yang H. Convolutional neural network-based block up-sampling for intra frame coding. IEEE Transactions on Circuits and Systems for Video Technology. Jul. 17, 2017;28(9):2316-30.*

Chakrabarty P, Maji S. The spectral bias of the deep image prior. arXiv preprint arXiv:1912.08905. Dec. 18, 2019.*

Tan DS, Yao CY, Ruiz Jr C, Hua KL. Single-image depth inference using generative adversarial networks. Sensors. Apr. 10, 2019;19 (7):1708.*

Ni Z, Yang W, Wang S, Ma L, Kwong S. Towards unsupervised deep image enhancement with generative adversarial network. IEEE Transactions on Image Processing. Sep. 22, 2020;29:9140-51.*

Andrade-Loarca H, Hege J, Cremers D, Kutyniok G. Neural Poisson Surface Reconstruction: Resolution-Agnostic Shape Reconstruction from Point Clouds. arXiv preprint arXiv:2308.01766. Aug. 3, 2023.*

Mildenhall et al., "NeRF: Representing Scenes as Neural Radiance Fields for View Synthesis," Communications of the ACM, 2021, vol. 65.1, pp. 99-106.

Chan et al., "pi-GAN: Periodic Implicit Generative Adversarial Networks for 3d-Aware Image Synthesis," Proceedings of the IEEE/CVF conference on computer vision and pattern recognition, 2021, pp. 5799-5809.

Park et al., "DeepSDF: Learning Continuous Signed Distance Functions for Shape Representation," Proceedings of the IEEE/CVF conference on computer vision and pattern recognition, 2019, pp. 165-174.

Yoon et al., "A Framework for Representation and Processing of Multi-View Video Using the Concept of Layered Depth Image," The Journal of VLSI Signal Processing Systems for Signal, Image, and Video Technology, 2007, 46, pp. 87-102.

* cited by examiner

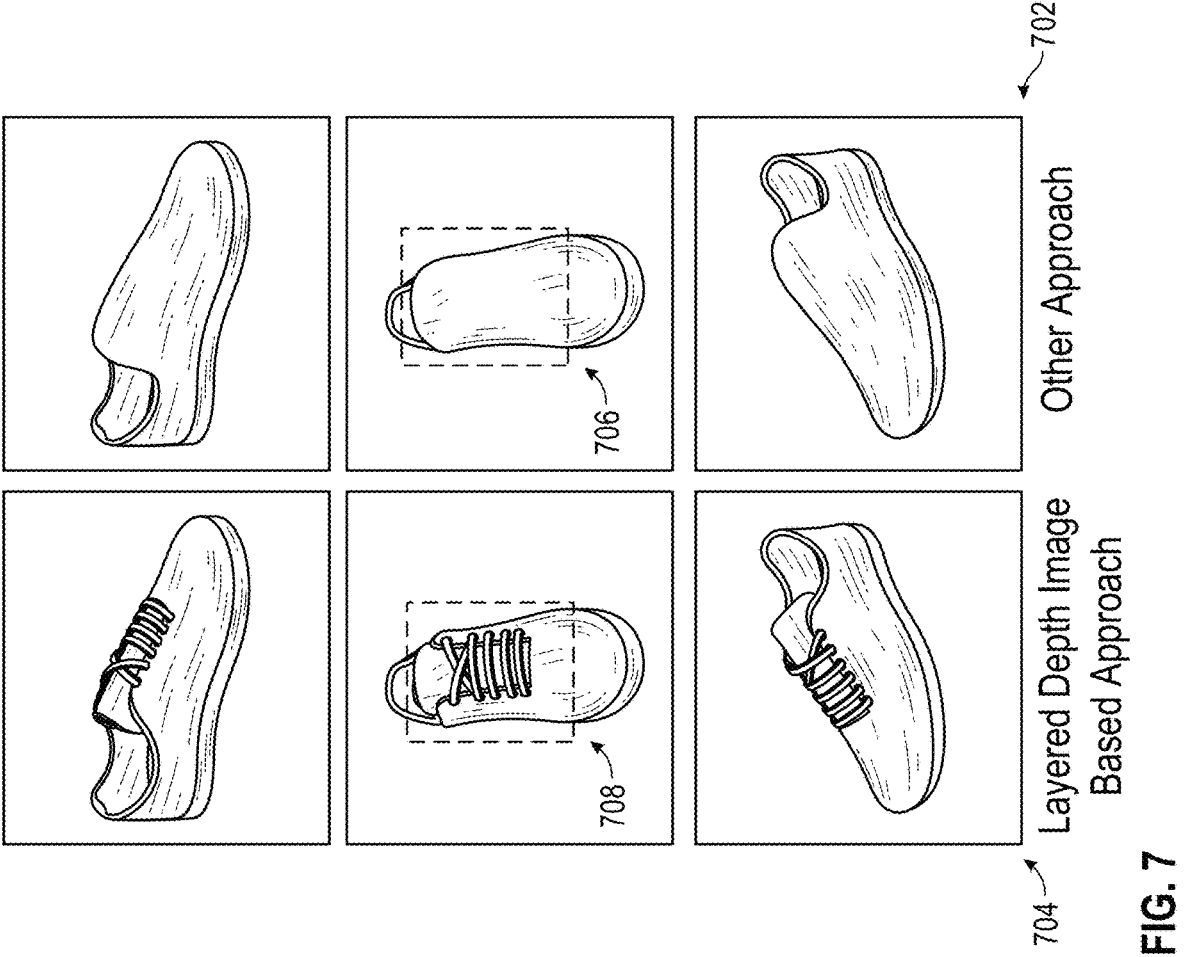
702
706
708
Other Approach
Layered Depth Image
Based Approach
704
FIG. 7
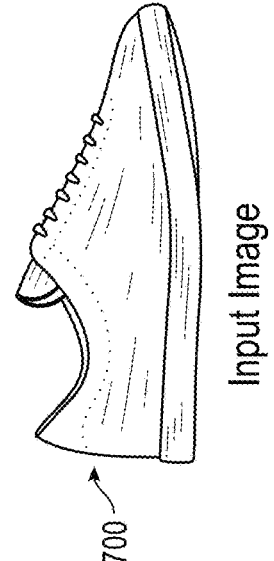
Input Image
700

GENERATIVE MODELING OF THREE-DIMENSIONAL OBJECT WITH LAYERED DEPTH IMAGES

BACKGROUND

Photogrammetry can refer to the process of taking photographs of an object and converting the photographs into a three-dimensional digital model. An existing approach to creating a three-dimensional model includes using a professional photogrammetry rig to capture initial scans and then a three-dimensional artist can create the final three-dimensional model from the scans. A professional photogrammetry rig can include approximately one hundred cameras, such as digital single-lens reflex (DSLR) cameras. The three-dimensional artist can spend at least eight hours to create the three-dimensional model. The three-dimensional model can be presented in an augmented reality application, such as a virtual try-on application.

BRIEF DESCRIPTION OF THE DRAWINGS

FIG. 7 is a diagram showing increased surface detail of three-dimensional models produced from layered depth images based approaches compared to previous approaches.

DETAILED DESCRIPTION

Figure 1:
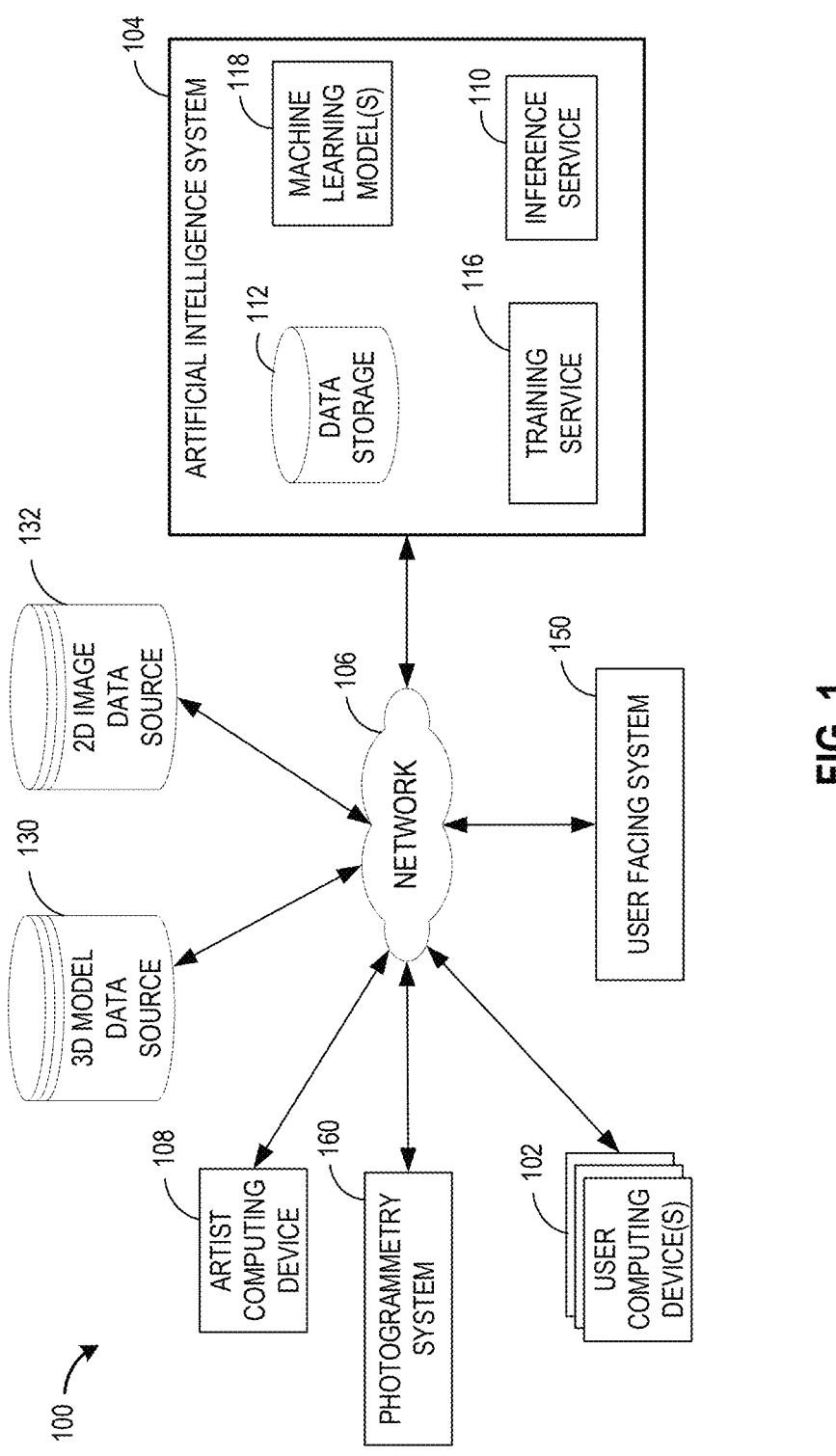
FIG. 1 is a schematic block diagram depicting an illustrative network environment for generating a three-dimensional model with layered depth images based on an input image.

As described above, existing methods for generating a three-dimensional model can be a time consuming and resource intensive process. One use of three-dimensional models is a virtual try-on augmented reality application for an electronic catalog. The electronic catalog can include many thousands, a million, or even more items. Two-dimensional images may exist for many of the items in the electronic catalog. However, only a small percentage of the items (such as one percent or two percent) may have corresponding three-dimensional models. Thus, in the context of a virtual try-on augmented reality application, the user experience is constrained by the lack of available three-dimensional models due to deficiencies with the existing methods for generating three-dimensional models.

Generally described, aspects of the present disclosure are directed to systems and methods for generating a three-dimensional model with layered depth images based on an input two-dimensional image. As used herein, a "layered depth image" can refer to a set of pixels organized in a layer from a reference viewpoint. Aspects of the present disclosure can utilize layered depth images as an efficient and/or scalable three-dimensional representation of an object. One or more machine learning models can be used to generate the three-dimensional model with layered depth images based on an input two-dimensional image. For training purposes, layered depth images can be derived from existing three-dimensional models. As described herein, an artificial intelligence (AI) system can train a machine learning model to predict multiple layered depth images from an input image of an object. The AI system can compare the generated, multiple layered depth images to the derived layered depth images for the object and accordingly update the machine learning model during training. At inference time, the AI system can receive an input image for an object that may not have an existing three-dimensional model. The AI system can use the trained machine learning model, which can also be referred to as a generative model, to output predicted layered depth images based on the input image. The AI system can generate a three-dimensional model for the object from the predicted layered depth images. In some embodiments, the AI system can use differentiable rendering to fine-tune the generative model.

Existing methods for generating three-dimensional shapes can have high training costs. Some existing methods for generating three-dimensional shapes can include, but are not limited to, Neural Radiance Fields (NeRF), Periodic Implicit Generative Adversarial Networks (pi-GAN), and/or Deep-SDF, a learned continuous Signed Distance Function (SDF) representation process. Some of the existing methods can generate three-dimensional shapes based on two-dimensional images with models that learn to implicitly represent the three-dimensional shapes. The existing methods can learn three-dimensional manifolds by sampling individual points and try to capture the three-dimensional volume in terms of different implicit functions. For example, some methods can use a coordinate-based multi-layer perceptron, and training for a single three-dimensional shape can require making neural network inferences with the multi-layer perceptron for millions of distinct points. Accordingly, a downside to some of these existing approaches, is that they can require sampling of a large amount of points during training, which can use a significant amount of computing resources, such as GPU memory. Moreover, making inferences with these existing approaches can use a significant amount of computing resources. For example, predicting three-dimensional shapes with existing methods can take hours with existing systems to complete. As used herein, the term "computing resource" can refer to a physical or virtual component of limited availability within a computer system. Computing resources can include, but are not limited to, computer processors, processor cycles, and/or memory.

The systems and methods described herein may improve computer performance to generate a three-dimensional model. As described above, existing approaches to generate three-dimensional shapes can use a large amount of computing resources. As described herein, using layered depth images to represent three-dimensional models and train machine learning models can be an efficient approach that uses fewer computing resources. Moreover, utilizing layered depth images may allow practical differentiable rendering since a three-dimensional model can be estimated in seconds instead of hours with the systems and methods described herein. The systems and methods described herein can use layered depth images to estimate three-dimensional models with reduced computing resources. Therefore, the systems and methods described herein can improve the functioning of a computer. Moreover, computer graphics such as three-dimensional models only exists because of computer technology. Therefore, the systems and methods described herein related to generating three-dimensional models may be inextricably tied to computer technology.

Deep learning networks have a certain capacity. So for given capacity, some existing methods represent the entire volume in three dimensions, which meant that those systems could not represent a lot details. The systems and methods described herein can instead use layered depth images, which can generally correspond to a stack of images, which can use the same capacity of the network to represent much higher details. So ultimately an advantage of the systems and methods described herein are relatively higher detailed geometries that can ultimately result in a much better user experience. In particular, the systems and methods described herein can significantly minimize wasted modeling capacity seen in other methods, such as the tendency for other methods to allocate unnecessary modeling capacity to empty spaces in three dimensions. The efficiency of layered depth images can allow complex visual details to be captured with exceptional fidelity. In contrast to the implicit three-dimensional representations that require extensive queries within the three-dimensional space to obtain detailed object information, the two-dimensional representation described herein can streamline and potentially speed up the evaluation process considerably. Moreover, by representing three-dimensional data in two-dimensional image space, the systems and methods described herein can advantageously achieve memory efficiency, which can improve the overall system's speed and/or scalability. This can be in stark contrast to the discrete voxel grid based three-dimensional representations, which can be memory-intensive, especially in high-resolution scenes. Furthermore, the use of two-dimensional representations can mean that the systems and methods described herein can directly leverage advanced two-dimensional generative modeling techniques, such as GANs and/or diffusion models. The use of two-dimensional representations can also facilitate image-based rendering with reduced computing resources and/or high fidelity, which can be a significant advantage. The approaches described herein can also capture the hidden surfaces for a given object and may not be category specific. Therefore, the systems and methods described herein can make it possible for three-dimensional models to be generated for a large catalog of items with a few primer three-dimensional models for training.

Turning to FIG. 1, an illustrative network environment 100 for generating a three-dimensional model with layered depth images based on an input image. The components of the network environment 100 can enable an efficient representation of three-dimensional surfaces as a set of two-dimensional depths and textures in different views and layers. As described herein, existing volumetric approaches for modeling three-dimensional objects can be computationally intensive that do not scale for systems with large amounts of distinct items. The components of the network environment 100 can further enable a training and inference pipeline that efficiently generates three-dimensional models from two-dimensional images for items in an electronic catalog. As described herein, the three-dimensional models can be used in a virtual try-on augmented reality application, for example. The network environment 100 may include a photogrammetry system 160, an artist computing device 108, a three-dimensional model data source 130, one or more user computing devices 102, a user facing system 150, a two-dimensional image data source 132, and an AI system 104. The AI system 104 may include an inference service 110, a training service 116, a data storage 112, and one or more machine learning models 118.

The photogrammetry system 160 can include a rig of cameras configured to surround an object. As described herein, the cameras can be DSLR cameras and the rig can include many cameras, such as approximately one hundred cameras. An operator can capture initial scans of an object with the photogrammetry system 160. A three-dimensional artist, via the artist computing device 108, can create a three-dimensional model from the initial scans. In some embodiments, the three-dimensional artist can use a graphics software application to create the three-dimensional model from the initial scans. The three-dimensional models that are created via resource-intensive methods can be stored in the three-dimensional model data source 130. As described herein, a small percentage of items from an electronic catalog may be modeled in three-dimensional via the resource-intensive methods.

The user facing system 150 can be the system that allows users using the user computing devices 102 to interact with three-dimensional models. In some embodiments, users may view three-dimensional models via the user facing system 150. Additionally or alternatively, the user facing system 150 can include or provide a virtual and/or augmented reality application. Users can interact with the three-dimensional models via the virtual and/or augmented reality application. User computing devices 102 can include, but are not limited to, a laptop or tablet computer, personal computer, personal digital assistant (PDA), hybrid PDA/mobile phone, smart wearable device (such as a smart watch), mobile phone, a smartphone, and/or a virtual reality device.

In some embodiments, the user facing system 150 can include an electronic catalog system. The electronic catalog system may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, item image(s) and description, customer ratings, customer and professional reviews, sales rank data, lists of related items, and/or other types of supplemental data that may assist consumers in making informed acquisition decisions. The user facing system 150 can provide a network page that enables users to interact with items, such as selecting, acquiring, consuming items (such as watching or playing a media content item), manipulating a three-dimensional model of the item, where available. Users of the system may, in some embodiments, locate specific item detail pages within the electronic catalog by executing search queries, navigating a browse tree, and/or using various other navigation techniques. In some embodiments, users can interact with available three-dimensional assets via a virtual and/or augmented reality application, such as an application that allows a virtual try-on of the item. In some contexts, a three-dimensional model can be referred to as a three-dimensional asset. An item can refer to a data object that can represent a specific thing that has one or more definable attributes. For example, an item can represent things such as, but not limited to, a physical product. Physical products can include, but are not limited to, furniture, clothing, shoes, tea pots, cups, etc.

In the AI system 104, the training service 116 can generate training data. The training data can include item images from the two-dimensional image data source 132. As described herein, the training service 116 can generate layered depth images from previously generated three-dimensional models from the three-dimensional model data source 130. The training data can include the layered depth images. The training data can be stored in the data storage 112. The training service 116 can train one or more machine learning models 118 with the training data. In particular, the training service 116 can train a machine learning model 118 to predict multiple layered depth images from an input image of an object. The training service 116 can compare the generated, multiple layered depth images to the derived layered depth images (which can be referred to as "ground truth") for the object to update the machine learning model 118 during training. At inference time, the inference service 110 can receive an input image from the two-dimensional image data source 132 for an object that may not have an existing three-dimensional model. The inference service 110 can use the trained machine learning model 118 to generate layered depth images based on the input image. The inference service 110 can generate a three-dimensional model for the object from the generated layered depth images. The inference service 110 can generate the three-dimensional model with fewer computing resources than some existing methods. The inference service 110 can generate three-dimensional models for respective item images from the two-dimensional image data source 132. In some embodiments, the training service 116 can use differentiable rendering to retrain the machine learning model(s) 118.

The data storage 112 may be embodied in hard disk drives, solid state memories, or any other type of non-transitory computer readable storage medium. The data storage 112 may also be distributed or partitioned across multiple local and/or remote storage devices. The data storage 112 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

The user computing devices 102, the AI system 104, and/or the user facing system 150 may each be embodied in a plurality of devices. Each of the user computing device 102, the AI system 104, and/or the user facing system 150 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program (a.k.a., computer-executable) instructions that the hardware processor executes in order to operate the user computing device 102, the AI system 104, and/or the user facing system 150. The memory generally includes RAM, ROM, and/or other persistent and/or auxiliary non-transitory computer readable storage media.

Additionally, in some embodiments, the AI system 104 and/or the user facing system 150 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
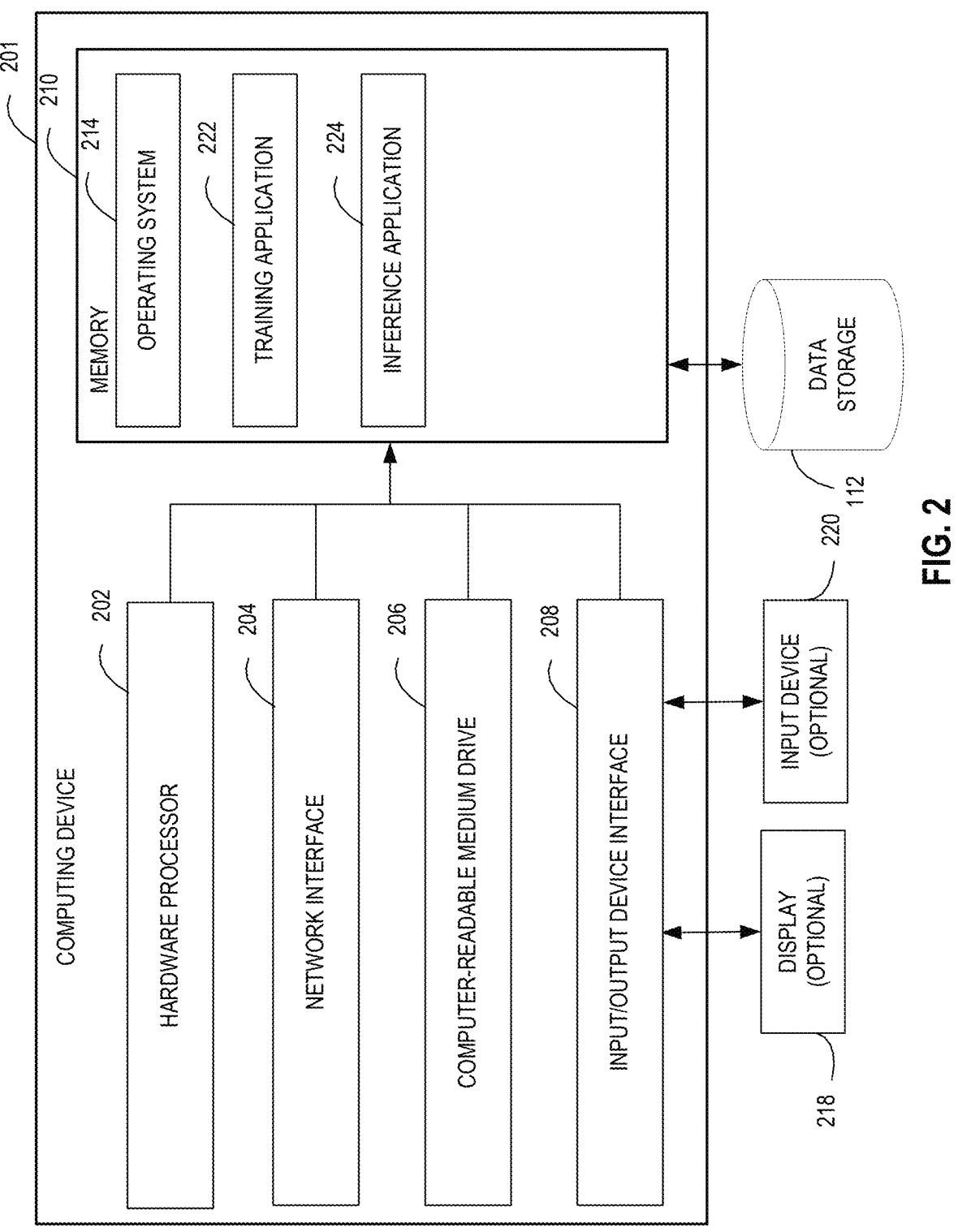
FIG. 2 is a schematic block diagram depicting an illustrative general architecture of a computing device for implementing the artificial intelligence system referenced in the network environment depicted in FIG. 1.

FIG. 2 is a schematic diagram of an illustrative general architecture of a computing device 201 for implementing the AI system 104 referenced in the environment 100 in FIG. 1. The computing device 201 includes an arrangement of computer hardware and software components that may be used to execute the training application 222 and/or the inference application 224. The general architecture of FIG. 2 can be used to implement other devices described herein, such as the user computing device 102 referenced in FIG. 1. The computing device 201 may include more (or fewer) components than those shown in FIG. 2. Further, other computing systems described herein may include similar implementation arrangements of computer hardware and/or software components.

The computing device 201 for implementing an AI system 104 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an optional display 218 and an optional input device 220. The network interface 204 may provide the computing device 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the AI system 104. The memory 210 generally includes RAM, ROM and/or other persistent or non-transitory computer-readable storage media. The memory 210 may store an operating system 214 that provides computer program instructions for use by the hardware processor 202 in the general administration and operation of the device within the AI system 104.

The memory 210 may include a training application 222 and/or an inference application 224 that may be executed by the hardware processor 202. In some embodiments, the training application 222 and/or the inference application 224 may implement various aspects of the present disclosure. In some embodiments, the training application 222 can generate training data, such as deriving layered depth images from existing three-dimensional models; the training application 222 can train and/or retrain machine learning model(s) to predict layered depth images from an input image; the inference application 224 can predict layered depth images for an input image; the inference application 224 can generate a three-dimensional model from the predicted layered depth images.

Figure 3:
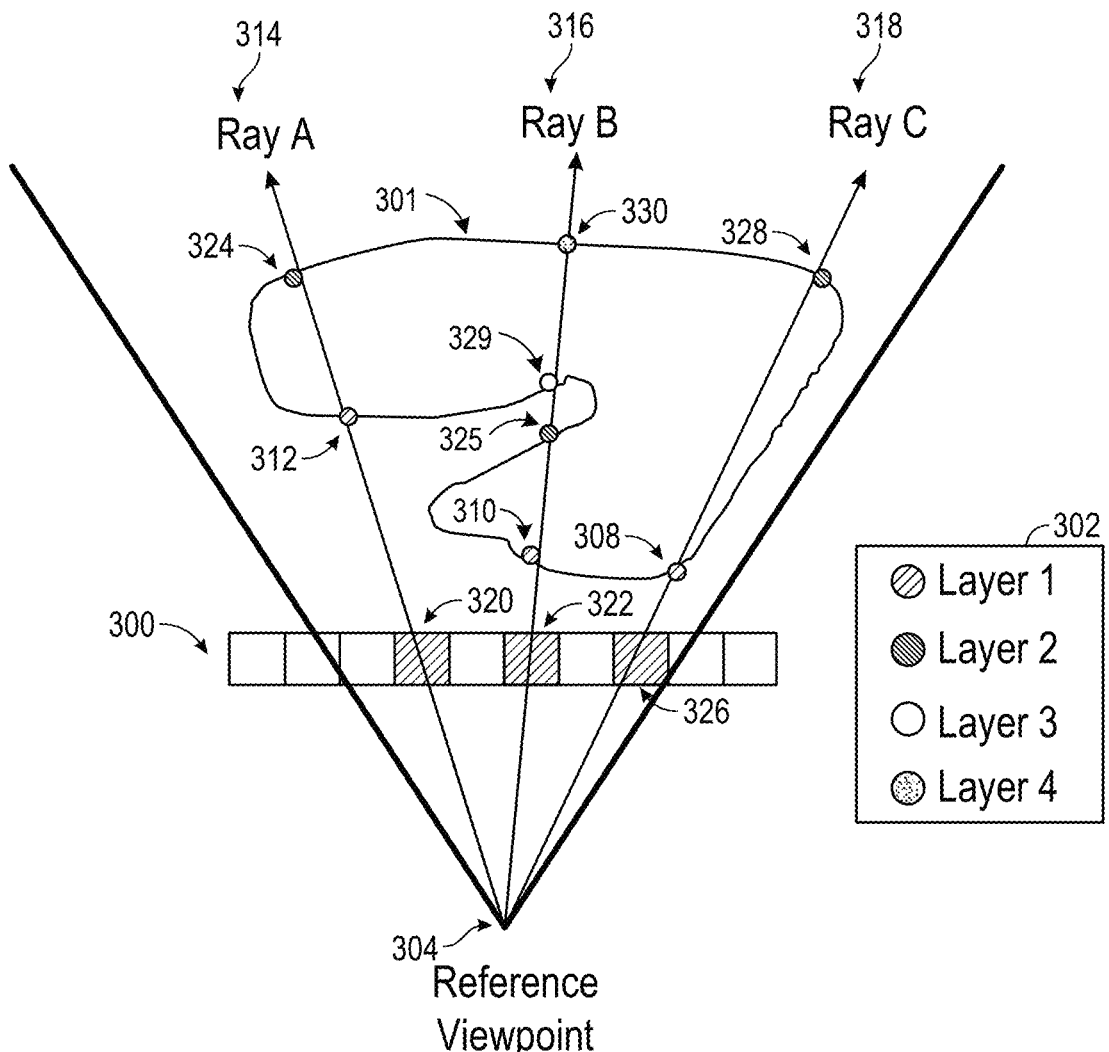
FIG. 3 is a diagram depicting a layered depth image of an object.

FIG. 3 is a diagram depicting a layered depth image of an object 301. An advantage of the layered depth image approaches described herein, is that a representation of a three-dimensional object can be compressed into several layered depth images, which can greatly reduce the representation size. As described herein, a layered depth image can refer to a set of pixels organized in a layer from a reference viewpoint 304. A "pixel" can refer to a unit in a digital display and/or a digital representation thereof. As shown by the legend 302, there can be multiple layers (here four layers) and multiple layered depth images for an object 301. Multiple rays (here rays A, B, and C 314, 316, 318) can emanate from the reference viewpoint 304 (which can be a camera). Each layer for a layered depth image can store intersecting points between the rays 314, 316, 318 and the object 301. Each layer can include an array. Each layer can correspond to a different cross section of an object.

In the first layer 300, the elements 320, 322, 326 can store the pixels for the intersecting points 312, 310, 308 between the object 301 and the rays 314, 316, 318. A second layer can store the pixels for the intersecting points 324, 325, 328 between the object 301 and the rays 314, 316, 318; a third layer can store the pixel for the intersecting point 329 between the object 301 and ray B 316; a fourth layer can store the pixel for the intersecting point 330 between the object 301 and ray B 316; and so forth.

In some embodiments, when depth estimations of an object are calculated, the pixel derived from the nearest edge of an object in relation to the reference viewpoint 304 can be recorded in a single layer, irrespective of the difference between the depth estimations. For example, a first point 312 and a second point 310 along ray A 314 and ray B 316, respectively, can both be recorded in the first layer 300, despite the two points being located at different depths. Successive depth layers can be created for each intersection of a ray with an edge of the object. Continuing with the example, ray A 314 can have two intersection points 312, 324, which can be recorded in two different layers; ray B 316 can have four intersection points 310, 325, 329, 330, which can be recorded in four different layers; and ray C 318 can have two intersection points 308, 328 which can be recorded in two different layers.

Each pixel in the layered depth image can have one or more attributes. Pixel attributes can include, but are not limited to, color and/or depth between the reference viewpoint and the camera. A layered depth pixel can store an ordered set of depth pixels along a ray, which can be referred to as a line of sight. The set of pixels in a layer can represent the edges (such as a boundary) on an object's surface. While not shown, multiple layered depth images of an object from multiple views can model the object in three dimensions. The layered depth images from multiple viewpoints can capture some or all of the surfaces of the object.

Figure 4A:
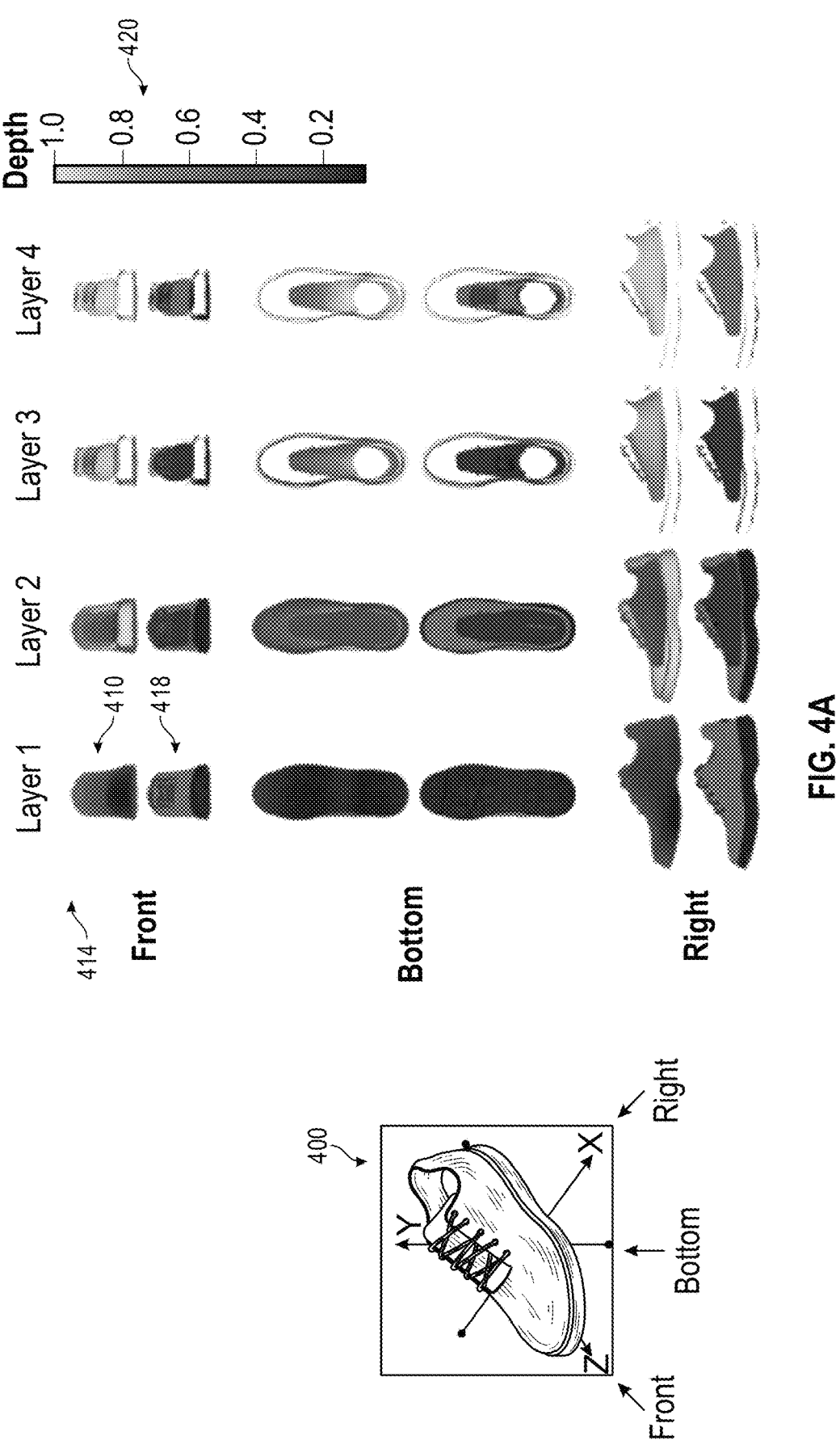
FIGS. 4A-4B are diagrams depicting multiple views and layers for layered depth images of an object.
Figure 4B:
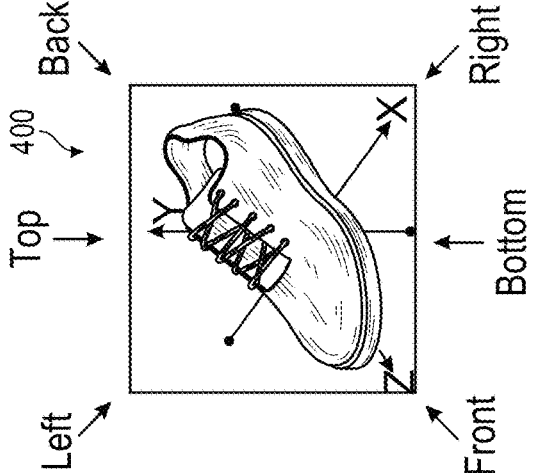

FIGS. 4A-4B are diagrams depicting multiple views and layers for layered depth images of an object 400. As described herein, an advantage of layered depth images as shown and described in FIGS. 4A-4B, is that the representation of a three-dimensional object with several layered depth images greatly reduces the representation size compared to some existing methods. In FIG. 4A, a first grid 414 can depict each layer and layered depth image from different reference viewpoints (here front, bottom, and right) of the object 400. Each row in the first grid 414 can depict pixel attributes. The first row at the first image 410 can represent depth information and/or the second row at the second image 418 can represent color information. As indicated by the legend 420, depth can be represented as a percentage. A bounding box can be fit around the object and the layer depth can be percentage of that bounding box dimension. As shown, depth images within the first grid 414, such as the first image 410, can indicate a gradient of different depths. In particular, the first image 410 can depict the pixel depths for a first layer and a front reference viewpoint. Color images within the first grid 414, such as the second image 418, can indicate color pixels. In particular, the second image 418 can depict the pixel colors for the first layer and the front reference viewpoint.

In FIG. 4B, a second grid 422 can be similar to the first grid 414 of FIG. 4A with the difference being the reference viewpoints being shown. In particular, the second grid 422 can depict each layer in layered depth images from different reference viewpoints (here back, top, and left) of the object 400. Similar to the first grid 414 of FIG. 4A, each row in the second grid 422 can depict pixel attributes. The first row at the first image 412 can represent depth information and/or the second row at the second image 428 can represent color information. As shown, depth images within the second grid 422, such as the first image 412, can indicate a gradient of different depths. In particular, the first image 412 can depict the pixel depths for a first layer and a back reference viewpoint. Color images within the second grid 422, such as the second image 428, can indicate color pixels. In particular, the second image 428 can depict the pixel colors for the first layer and the back reference viewpoint. As shown in FIGS. 4A-4B, layered depth images can capture the hidden surfaces of objects, such as, but not limited to the interiors of shoes, garments, etc. In some embodiments, views different from front, bottom, right, back, top, and left can be used.

Figure 5:
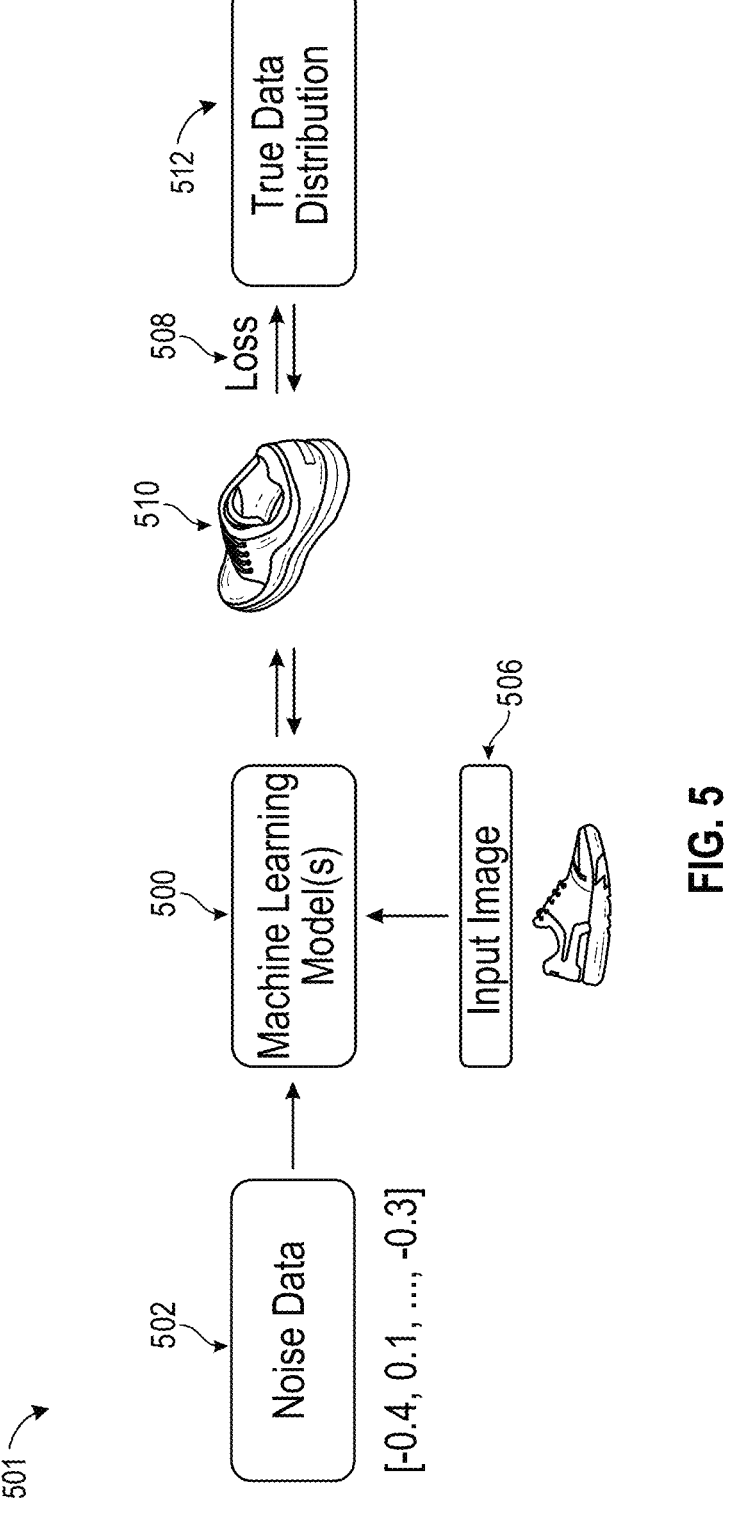
FIG. 5 is a schematic block diagram depicting a method of training a generative model.

FIG. 5 is a schematic block diagram depicting a method 501 of training one or more machine learning models 500. Advantages of the method 501 can include improved training of machine learning models with reduced computing resources due to the usage of layered depth images with reduced representation sizes. During training, a machine learning model 500 can receive noise data 502 and an input image 506 as input. The noise data 502 can be random or pseudo-random. In some embodiments, the one or more machine learning models 500 can include a diffusion model (such as a diffusion model using U-Net) and/or a generative adversarial network (GAN) model. In some embodiments, the machine learning model 500 can receive the noise data 502 and the input image 506 to predict layered depth image(s) 510. During training, the method 501 can calculate loss 508 between the predicted layered depth image(s) and actual layered depth image(s). The method 501 can use the loss 508 to learn the true data distribution 512 of the training set. Moreover, the method 501 can apply additional processes to convert the generated layered depth images to a three-dimensional model. Thus, the trained one or more machine learning models 500 can be used to predict layered depth images for new input images and the predicted layered depth images can be used to generate a three-dimensional model.

In some embodiments, the machine learning model 500 (such as a diffusion model) can function by beginning with the noise data 502 and iteratively predict an image with less noise. In some cases, such as the case where a GAN model is used, the noise data 502 can be optional or omitted. Additionally or alternatively, the more machine learning model(s) 500 can output a three-dimensional model and the method 501 can calculate the loss 508 by comparing a predicted three-dimensional model to an existing three-dimensional model.

Figure 6A:
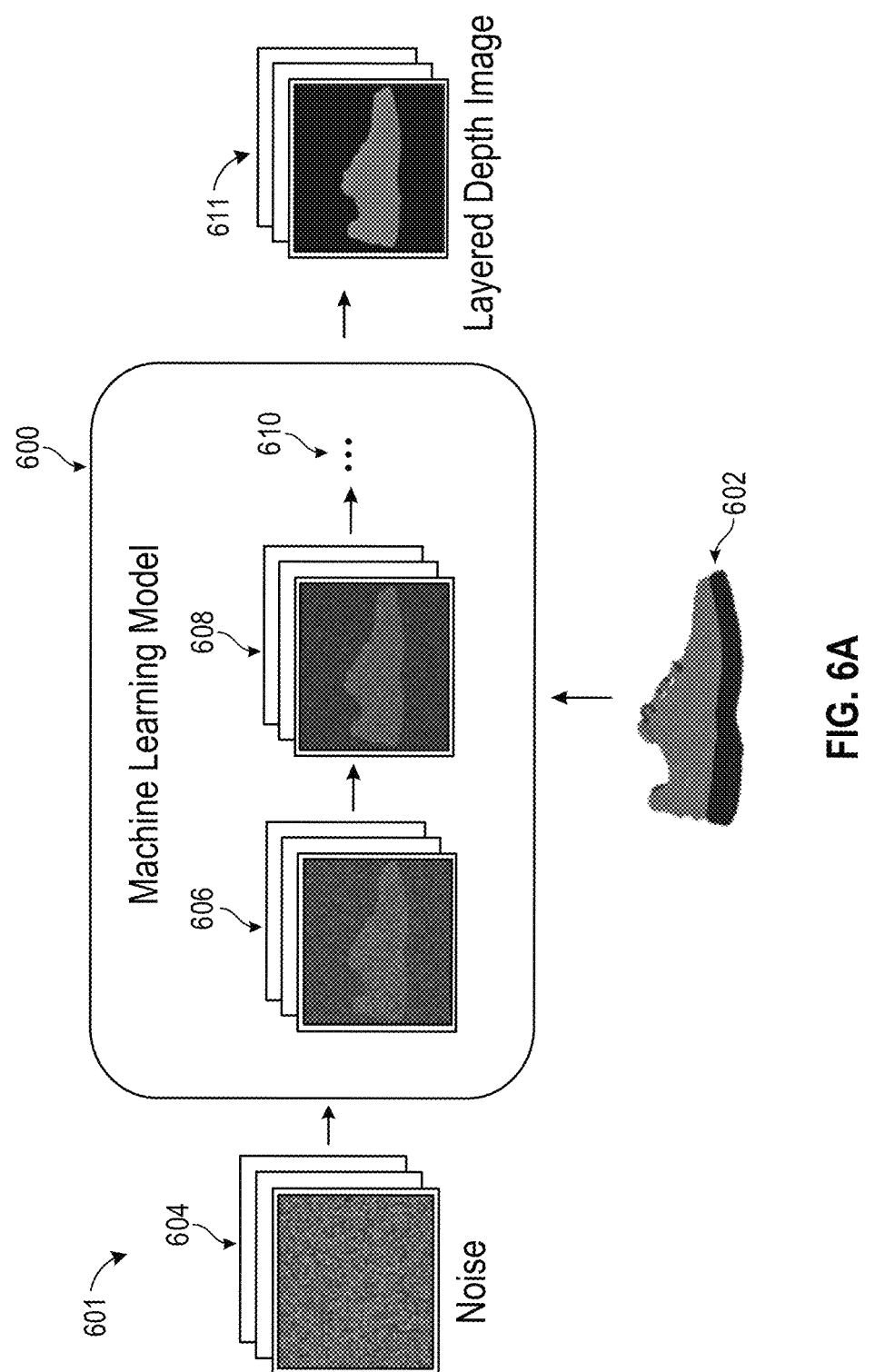
FIG. 6A is a schematic block diagram depicting a method of predicting layered depth images and a three-dimensional model for an object.
Figure 6B:
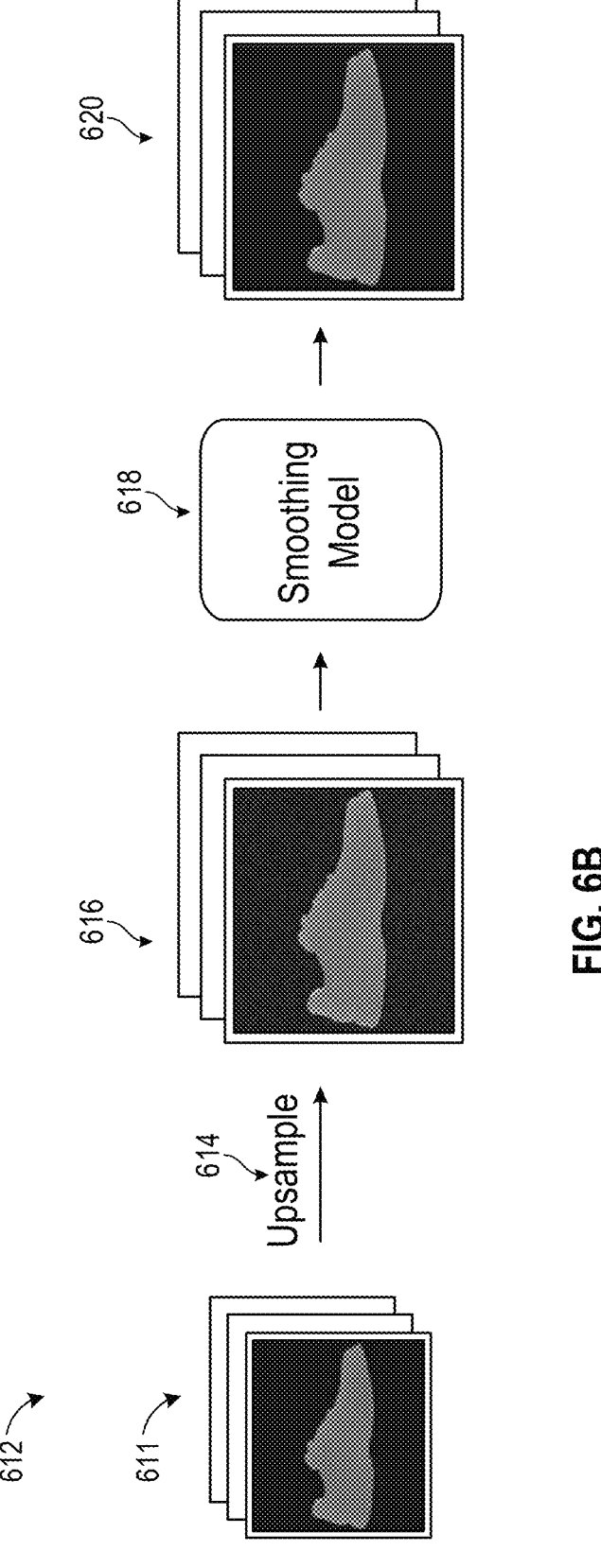
FIG. 6B is a schematic block diagram depicting a method of refining predicted layered depth images.
Figure 6C:
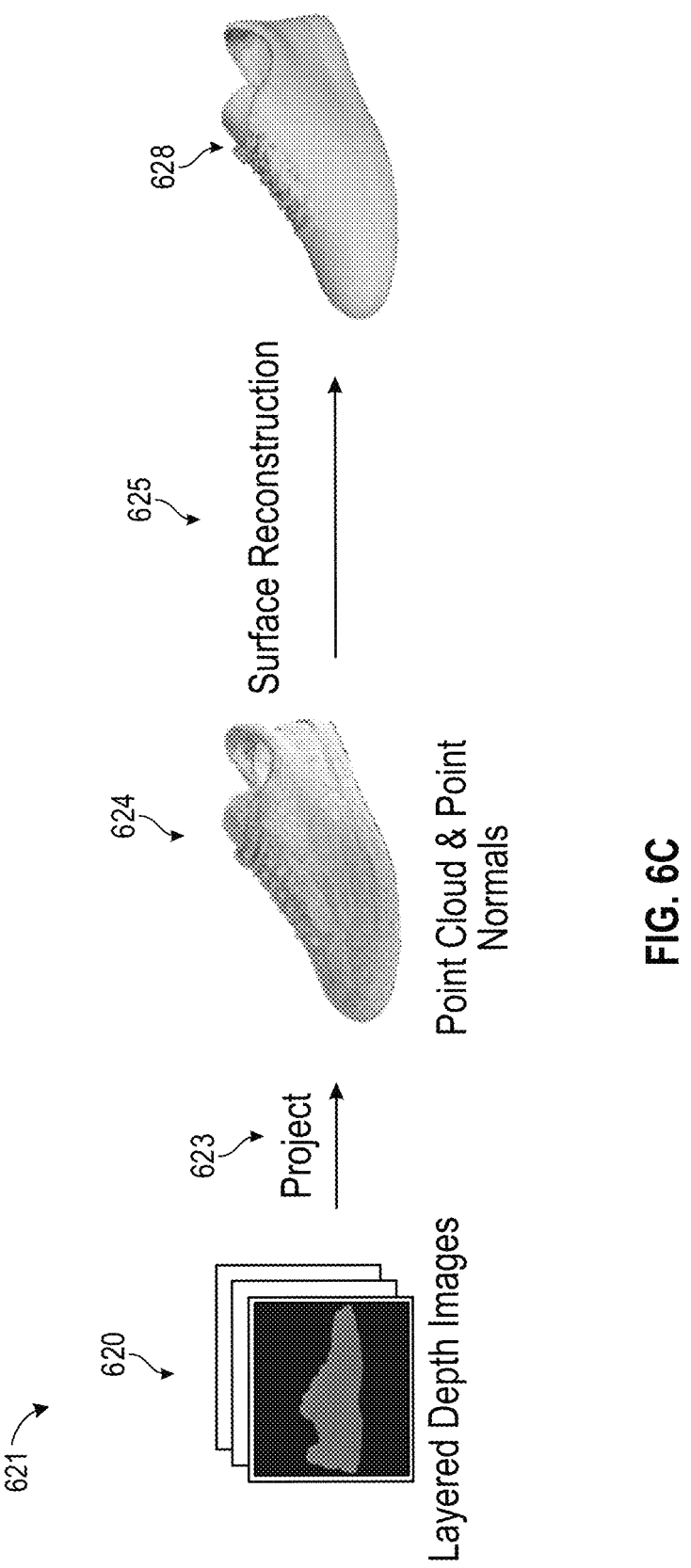
FIG. 6C is a schematic block diagram depicting a method of generating a three-dimensional model from predicted layered depth images.

FIGS. 6A-6C are schematic block diagrams showing methods related to generating a three-dimensional model based on layered depth images predicted from an input image. Advantages of the methods of FIGS. 6A-6C can include improved inferencing via machine learning models with reduced computing resources due to the usage of layered depth images with reduced representation sizes. The methods of FIGS. 6A-6C can contrast with existing methods that may require millions of network queries on three-dimensional points in order to arrive at a predicted three-dimensional model.

FIG. 6A is a schematic block diagram depicting a method 601 of predicting layered depth images and a three-dimensional model for an object. At inference time, a machine learning model 600 can receive noise data 604 (such as an initial set of layered depth images with noise) and an input image 602 as input. As described herein, the machine learning model 600 can include or be a diffusion model. As shown, the machine learning model 600 can internally process the noise data 604 to determine a first set of layered depth images 606 with less noise. The machine learning model 600 can iteratively process the first set of layered depth images 606 to determine a second set of layered depth images 608 with even less noise. The method 601 can iteratively repeat the process until a threshold as satisfied, as indicated by the ellipsis 610. As a result, the machine learning model 600 can output the set of layered depth images 611. Each layered depth image from the set of layered depth images can be from a reference viewpoint (such as from one of six orthogonal views, for example) and the set of layered depth images can have multiple layers (such as four, for example). In some embodiments, the machine learning model 600 can output a mask for each layered depth image.

FIG. 6B is a schematic block diagram depicting a method 612 of refining predicted layered depth images. The method 612 can receive a first set of layered depth images 611, which can be the predicted set of layered depth images 611 from the previous method 601 of FIG. 6A. As received by the method 612, the first set of layered depth images 611 can have relatively low resolution (such as 256 pixels×256 pixels). Accordingly, the method 612 can perform an upsampling process 614 on the first set of layered depth images 611 that results in a second set of layered depth images 611 with a higher resolution (such as 1024 pixels×1024 pixels) than the resolution of the first set of layered depth images 611. Depending on the embodiment, the method 612 can use different upsampling processes 614 such as, but not limited to, different upscaling methods and/or AI-based methods for increasing resolution. In some embodiments, the upsampling process 614 can include filtering (such as interpolating) of the increased resolution layered depth images 611. The upsampling process 614 can output a second set of layered depth images 616 with higher resolution than the resolution of the first set of layered depth images 611. As upsampled, the second set of layered depth images 616 may have distortions, such as noise. The method 612 can apply a smoothing model 618 to the second set of layered depth images 616. The smoothing model 618 can output a third set of layered depth images 620 with less distortions. The smoothing model 618 can be or include a convolutional neural network (CNN) and/or a GAN, such as a super-resolution generative adversarial network (SRGAN). In some embodiments, the method 612 of refining predicted layered depth images can be optional. For example, if the machine learning model (such as the machine learning model 500 of FIG. 5) for predicting layered depth images is a GAN, then refining (such as super-resolution refining) may be already built into the machine learning model.

FIG. 6C is a schematic block diagram depicting a method 621 of generating a three-dimensional model 628 from predicted layered depth images 620. The method 621 can receive a set of layered depth images 620, which can be the set of super-resolution layered depth images 620 from the previous method 612 of FIG. 6B. The method 621 can perform a projection process 623 on the set of layered depth images 620 that results in a point cloud and/or point normals 624. A point cloud can include data points in a three-dimensional coordinate system. The data points can indicate spatial measurements of the surface of an object. A point normal can refer to a normal vector for each point in the point cloud.

As described herein, some machine learning models that output predicted layered depth images can also output masks. The projection process 623 can use the output masks to integrate depth images. A mask can indicate for a first direction/viewpoint, which depth image to use, and from another direction viewpoint, the mask can indicate how much depth to use from the depth image. In some embodiments, the projection process 623 can use the mask(s) to determine how much of a first depth image should be integrated with the second depth image.

The method 621 can perform a surface reconstruction process 625 to generate surfaces for the three-dimensional model from the point cloud 624. The surface reconstruction process 625 can include a screened Poisson surface reconstruction process. The screened Poisson surface reconstruction process can use mathematical models to interpolate a solid surface between three-dimensional points in the point cloud 624. A result of the execution of the surface reconstruction process 625 can include the generated three-dimensional model 628.

FIG. 7 is a diagram showing increased surface detail of three-dimensional models produced from layered depth images based approaches compared to previous approaches. Existing approaches that do not use layered depth images for three-dimensional model generation, such as volumetric approaches (in particular DeepSDF), can receive input based on the input image 700 and output a first three-dimensional model, as shown by the first set of views 702 of the first three-dimensional model. The layered depth image based approaches for three-dimensional model generation described herein can receive input based on the input image 700 and output a second three-dimensional model, as shown by the second set of views 704 of the second three-dimensional model. In contrast to the existing volumetric approaches that generated the first three-dimensional model, the layered depth image based approaches can generate the second three-dimensional model that has more accurate surface details compared to the first three-dimensional model. As described herein, the generated layered depth images with multiple layers can enable the systems and methods described herein to capture surface details of the object. As shown, a first area 706 (such as the laces area) of the first three-dimensional model can have less surface detail than the second area 708 (such as the laces) of the second three-dimensional model.

Figure 8:
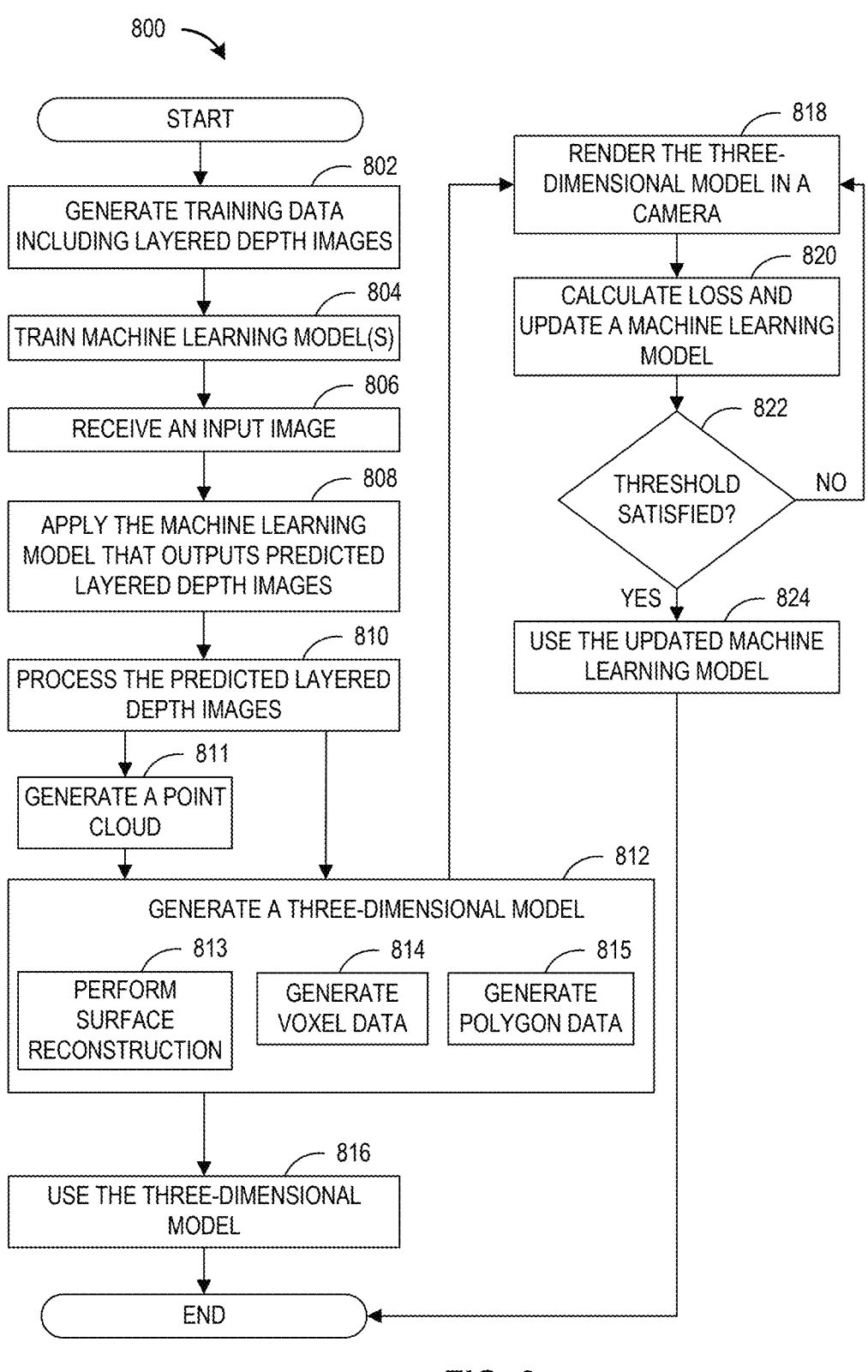
FIG. 8 is a flow chart depicting a method implemented by the AI system three-dimensional model estimation from predicted layered depth images.

FIG. 8 includes a flow chart depicting a computer-implemented method 800 for three-dimensional model estimation from predicted layered depth images. The method 800 can enable a training and inference pipeline(s) that efficiently generates three-dimensional models from compact object representations with layered depth images. As described herein, the method 800 can be applied to situations where a large catalog of images exists without corresponding three-dimensional models. The generated three-dimensional models can advantageously be used within virtual reality and/or augmented reality contexts.

As described herein, the AI system 104, which includes the inference service 110 and the training service 116, may be implemented with the computing device 201 of FIG. 2. In some embodiments, the computing device 201 may include the training application 222 and/or the inference application 224 each of which may implement aspects of the method 800. Moreover, some aspects of the method 800 may be described above with respect to FIGS. 5, 6A, 6B, 6C.

Beginning at block 802, training data (including layered depth images) can be generated. The training service 116 can generate training data, which can include layered depth images derived from existing three-dimensional models. The training service 116 can receive a training three-dimensional model of a training object. As described herein, an artist can prepare a three-dimensional model from scans that originated from the photogrammetry system 160. The existing three-dimensional model can be used as ground truth for training purposes. The training service 116 can generate a set of training layered depth images based at least in part on the training three-dimensional model. The training three-dimensional model can include or correspond to a mesh. The training service 116 can calculate a set of training layered depth images using raytracing from different reference viewpoints based on an existing three-dimensional model. The training service 116, given the mesh of a training object, can use a rendering engine to perform ray tracing on the mesh to obtain ground truth layered depth images. In some embodiments, the training service 116 can apply ray tracing on six views (which can be orthogonal) to obtain multi-view layered depth images where the set of layered depth images have multiple layers (such as four layers). The training service 116 can determine the set of training layered depth images using depth peeling of the existing three-dimensional model. For each training object, the training service 116 can include image data for the training object and its corresponding set of layered depth images as an input-output training data pair. In some embodiments, such as, but not limited to, where a diffusion model is trained, the training service 116 can include noise data in the training data. Additional details regarding layered depth images are described herein, such as with respect to FIGS. 3, 4A, 4B.

At block 804, one or more machine learning models can be trained. The training service 116 can train an initial machine learning model with the training data. As described herein, the initial machine learning model can include, but are not limited to, diffusional models and/or a GAN model. The training data can include, but is not limited to, image data for the training object, noise data, and/or the set of training layered depth images. During training, the training service 116 determine a loss and a gradient of a neural network and update, based at least in part on the loss and the gradient, a weight or a bias of the neural network that results in a trained machine learning model. During training, given an image of the object as the input condition, the training service 116 trains the machine learning model to predict the multi-view layered depth images of the object and compare the prediction with the ground truth in order to optimize the machine learning model. The training service 116 train the machine learning model 500 (such as a diffusion model) can begin with the noise data and iteratively predict an image with less noise until a threshold is satisfied (such as a threshold number of iterations or loss satisfies a threshold). The training service 116 can iteratively train the machine learning model with the training data until a threshold is satisfied (such as a threshold number of iterations and/or all the training data has been processed). In some embodiments, the ground truth can include texture data and a machine learning model can be trained to predict texture data. In some embodiments, additional machine learning models can be trained, such as a smoothing model that can smooth the layered depth images following upscaling. Additional details regarding training are described herein, such as with respect to FIG. 5.

At block 806, an input image of an object can be received. The inference service 110 can receive the input image. For example, in the context of an electronic catalog, the input image can be a catalog image. As described herein, a three-dimensional model for the object may not exist yet. In some embodiments, the inference service 110 can receive multiple input images, such as the multiple image views for an item in a catalog.

At block 808, the machine learning model can be applied that outputs predicted layered depth images. The inference service 110 can apply a machine learning model to input based at least in part on the input image. In some embodiments, the inference service 110 can convert the input image to vector data and provide the vector data to the machine learning model. The vector data can be a matrix representation of the input image. Additionally or alternatively, the inference service 110 can provide noise data to the machine learning model as input. In some embodiments, the inference service 110 can apply the machine learning model to input based at least in part on multiple input images, such as the multiple image views for an item in a catalog. The machine learning model can output a set of layered depth images. As described herein, a layered depth image can include a set of pixels organized in a layer from a reference viewpoint. The set of layered depth images can include multiple layers and multiple views. Additional details regarding layered depth images are described herein, such as with respect to FIGS. 3, 4A, 4B. In some embodiments, the machine learning model can correspond to a diffusion model and applying the machine learning model can include iteratively denoising data until a threshold is satisfied (such as a threshold number of iterations). In other embodiments, the machine learning model can correspond to a GAN model, such as a StyleGAN model. An advantage of GAN models such as StyleGAN models is that they can produce higher fidelity images (such as higher resolution) relative to other models, such as diffusion models. The set of layered depth images can include six views and four layers. In other embodiments, a different number of views and/or layers can be used. For example, depending on the type of object (such as objects with sufficient symmetry) two, three, four, five, etc. views may be used. In some embodiments, as described herein, the machine learning model can output texture data and/or masks. In some embodiments, the texture data can include RGB image data. RGB image data, which can be referred to as a truecolor image, can be stored as an m-by-n-by-3 data array that defines red, green, and blue color components for each individual pixel. Additional details regarding applying a machine learning model to predict layered depth images are described herein, such as with respect to FIG. 6A.

At block 810, the predicted layered depth images can be processed. The inference service 110 can process the predicted layered depth images from the previous block 808. For example, the inference service 110 can execute an upsampling process on a first set of layered depth images that outputs a second set of layered depth images. A second layered depth image from the second set of layered depth images can have a higher resolution than a first layered depth image from the first set. For example, the upsampling process can increase the resolution of an image from 256 pixels×256 pixels to 1024 pixels×1024 pixels. The inference service 110 can apply a smoothing model to input based at least in part on the upscaled layered depth images. The smoothing model can output a set of layered depth images. The smoothing model can be or include a convolutional neural network (CNN) and/or a GAN. In other embodiments, some or all of the processing at block 810 can be omitted or built into the machine learning model of the previous block 808. For example, if the machine learning model is a GAN model, then the super-resolution steps at block 810 may not need to be performed but may instead be executed at the previous block 808. Additional details regarding additional processing of layered depth images are described herein, such as with respect to FIG. 6B.

At block 811, a point cloud can be generated. The inference service 110 can generate a point cloud based at least in part on the set of layered depth images. The inference service 110 can execute a projection process on the set of layered depth images that results in the point cloud and/or point normals. As described herein, a point cloud can include data points in a three-dimensional coordinate system. The inference service 110 can fuse multiple layered depth images to result in the point cloud. As described herein, the machine learning model can also output mask for each predicted layered depth image. The projection process can use the output masks to integrate depth images into the point cloud. Additional details regarding generating a point cloud are described herein, such as with respect to FIG. 6C.

At block 812, a three-dimensional model can be generated. The block 812 for generating a three-dimensional model can include blocks 813, 814, 815 for generating the model in different ways depending on the embodiment. In some embodiments, the inference service 110 can generate a three-dimensional model based at least in part on the point cloud. At block 813, surface reconstruction can be performed. The inference service 110 can perform surface reconstruction on the point cloud. The inference service 110 can perform screened Poisson surface reconstruction that outputs a mesh. As used herein, a "mesh" can refer to a three-dimensional object representation that can include a collection of vertices and polygons. The three-dimensional object representation can be a polygon mesh, which can include a collection of vertices and polygons that define the shape of the object in three dimensions. In some embodiments, the inference service 110 can apply a texture to the mesh based at least in part on the texture data. The inference service 110 can use relatively high resolution images to represent the textures on each camera or each canonical views at each layer, which allows the three-dimensional object to have relatively high resolution textures represented. Additional details regarding generating a three-dimensional model are described herein, such as with respect to FIG. 6C.

As described herein, alternative methods can be used to generate the three-dimensional model based on the embodiment. For example, some alternative methods may generate the three-dimensional model without using a point cloud. At block 814, voxel data can be generated. The inference service 110 can generate a three-dimensional model based at least in part on the set of layered depth images. The inference service 110 can execute a projection process on the set of layered depth images that results in voxel data. A voxel, also known as a three-dimensional pixel, can refer to a three-dimensional cube located on a three-dimensional grid. The voxel data can represent the three-dimensional model. Additionally or alternatively, polygon data can be generated to represent the three-dimensional model.

At block 815, polygon data can be generated. The inference service 110 can generate a three-dimensional model based at least in part on the set of layered depth images. The inference service 110 can execute a projection process on the set of layered depth images that results in polygon data. Polygons can be used in computer graphics to compose three-dimensional images. The inference service 110 can use the layered depth image data to generate polygons (such as triangular shapes), select vertices, and render the object in a wire frame model with polygon data (such as a polygon mesh). The polygon data can represent the three-dimensional model.

At block 816, the three-dimensional model can be used. For example, the user facing system 150 can cause presentation of the three-dimensional model in at least one of an augmented reality application or virtual reality application via the user computing device 102. As described herein, the three-dimensional model can be a shoe or some item of clothing than can be previewed by a user in the augmented reality application and/or virtual reality application. Additionally or alternatively, a user can view and/or manipulate the item in three hundred and sixty degrees via a user interface of the user facing system 150. In some embodiments, optional differentiable rendering can be performed to fine-tune the machine learning model.

At block 818, a three-dimensional model can be rendered in a camera. The training service 116 can render the three-dimensional model in a camera and the camera can output an output image. The camera can be a virtual camera and the virtual camera can be the rendering camera for the previously generated three-dimensional model.

At block 820, loss can be calculated and a machine learning model can be updated. Differentiable rendering can allow two-dimensional image pixels to be related back to three-dimensional object properties. The training service 116 can render an image from a predicted three-dimensional object, as described herein, and the training service 116 compute a two-dimensional loss with a reference image. The training service 116 can invert the rendering process and relate the two-dimensional loss from the pixels back to the three-dimensional properties of the shape such as the positions of mesh vertices, which can enable three-dimensional shapes to be learned without any explicit three-dimensional supervision. Moreover, the efficient representations of three-dimensional objects with layered depth images can reduce the computing resource usage in differentiable rendering and, thereby, make differentiable rendering a scalable solution to fine-tune machine learning models since the approaches described herein can generate rendered images much faster than previous methods (such as generating rendered images in seconds instead of hours with previous methods). The training service 116 can determine a loss and a gradient of a neural network (such as the neural network in the machine learning model). The training service 116 can determine the loss and the gradient by comparing the input image and the output image. The training service 116 can update, based at least in part on the loss and the gradient, a weight or a bias of the neural network that results in an updated machine learning model.

Differentiable rendering can allow training based on images and without necessarily needing ground truth three-dimensional data. In other words, differentiable rendering can allow fine-tuning a machine learning model to unseen types of objects. For example, a first type associated with the first object used in differentiable rendering can be different from a second type associated with the training object. In some cases, the training service 116 may not need three-dimensional training data and the trained machine learning model can become a large multimodal model, such as a large three-dimensional generative model, where the training service 116 can train the model without three-dimensional training data, such as by exclusively training with image data.

Training can include fine-tuning. Fine-tuning can refer to an approach to transfer learning where the weights of an already trained model are trained on new data. Fine-tuning can be performed on the entire neural network or on only a subset of its layers, in which case the layers that are not being fine-tuned remain the same. In some embodiments, during fine-tuning the learning rate for training can be lowered.

At block 822, it can be determined whether a threshold has been satisfied. The training service 116 can determine whether a threshold has been satisfied to cease differentiable rendering. The training service 116 can determine that a threshold number of iterations have been satisfied. Additionally or alternatively, training service 116 can determine that loss or a value based on loss satisfies a threshold. If a threshold has been satisfied, the method can proceed to block 824 to use the updated machine learning model. If a threshold has not been satisfied, the method 800 can return to block 812 to continue rendering the same three-dimensional object or other three-dimensional objects and continue to update the machine learning model through differentiable rendering.

At block 824, the updated machine learning model can be used. The inference service 110 can receive input images and apply the updated machine learning model to predict layered depth images and ultimately generate a three-dimensional object. The generated three-dimensional object can be used as described herein, such as with respect to the previous block 816 for using a three-dimensional object.

While virtual reality and/or augmented reality is used as an example context for three-dimensional objects, the systems and methods described herein can be applied to other contexts, such as, but not limited to, gaming, computer-generated visual effects (VFX), and/or computer animation. Moreover, while some of the figures use a shoe as an example physical object, the systems and methods described herein can be applied to other physical objects, such as, but not limited to, furniture, clothing, tea pots, cups, etc.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for creating a three-dimensional asset from a catalog image, comprising:
a non-transitory data storage medium to store specific computer-executable instructions; and
a computer hardware processor in communication with the non-transitory data storage medium, wherein the computer hardware processor is to execute the specific computer-executable instructions to at least:
receive an input image of an object;
apply a first machine learning model to first input based at least in part on the input image, wherein the first machine learning model outputs a first set of layered depth images,
wherein a first layered depth image from the first set of layered depth images comprises a first set of pixels organized in at least a first layer from a first reference viewpoint, and wherein a second layered depth image from the first set of layered depth images comprises a second set of pixels organized in at least a second layer from a second reference viewpoint;
generate a point cloud based at least in part on the first set of layered depth images, wherein to generate the point cloud, the computer hardware processor is to execute the specific computer-executable instructions to at least:
execute an upsampling process on the first set of layered depth images that outputs a second set of layered depth images, wherein a layered depth image from the second set of layered depth images has a higher resolution than the first layered depth image;
apply a smoothing model to second input based at least in part on the layered depth image from the second set of layered depth images, wherein the smoothing model outputs a third layered depth image; and
fuse the third layered depth image and at least one other layered depth image that results in the point cloud;
generate a three-dimensional model from a surface reconstruction performed on the point cloud; and
cause presentation of the three-dimensional model in at least one of an augmented reality application or virtual reality application.

2. The system of claim 1, wherein the computer hardware processor executes further computer-executable instructions to at least:
receive a training three-dimensional model of a training object;
generate a set of training layered depth images based at least in part on the training three-dimensional model; and
train an initial machine learning model with training data comprising image data for the training object, noise data, and the set of training layered depth images,
wherein to train the initial machine learning model, the computer hardware processor is to execute the further computer-executable instructions to at least:
determine a loss and a gradient of a neural network; and
update, based at least in part on the loss and the gradient, a weight or a bias of the neural network that results in the first machine learning model.

3. The system of claim 1, the first set of layered depth images comprise six views and four layers.

4. A computer-implemented method comprising:
receiving an input image of an object;
applying a first machine learning model to first input based at least in part on the input image, wherein the first machine learning model outputs a first set of layered depth images,
wherein a first layered depth image from the first set of layered depth images comprises a first set of pixels organized in at least a first layer from a first reference viewpoint, and
wherein a second layered depth image from the first set of layered depth images comprises a second set of pixels organized in at least a second layer from a second reference viewpoint;
generating a point cloud based at least in part on the first set of layered depth images, wherein generating the point cloud comprises:
executing an upsampling process on the first set of layered depth images that outputs a second set of layered depth images, wherein a layered depth image from the second set of layered depth images has a higher resolution than the first layered depth image;

applying a smoothing model to second input based at least in part on the layered depth image from the second set of layered depth images, wherein the smoothing model outputs a third layered depth image; and fusing the third layered depth image and at least one other layered depth image that results in the point cloud; and generating a three-dimensional model from a surface reconstruction performed on the point cloud.

5. The computer-implemented method of claim 4, wherein the smoothing model comprises a convolutional neural network.

6. The computer-implemented method of claim 4, further comprising:

rendering, in a camera, the three-dimensional model, wherein the camera outputs an output image;

determining a loss and a gradient of a neural network, wherein determining the loss and the gradient further comprises comparing the input image and the output image; and updating, based at least in part on the loss and the gradient, a weight or a bias of the neural network that results in an updated machine learning model.

7. The computer-implemented method of claim 4, wherein the first machine learning model further outputs texture data, wherein performing surface reconstruction further comprises performing screened Poisson surface reconstruction that outputs a mesh, and wherein generating the three-dimensional model further comprises applying a texture to the mesh based at least in part on the texture data.

8. The computer-implemented method of claim 4, wherein the first input comprises noise data.

9. The computer-implemented method of claim 8, wherein the first machine learning model corresponds to a diffusion model, and wherein applying the first machine learning model comprises iteratively denoising data until a threshold is satisfied.

10. The computer-implemented method of claim 4, wherein the first machine learning model corresponds to a generative adversarial network.

11. A system comprising:

a non-transitory data storage medium to store computer-executable instructions; and a computer hardware processor in communication with the non-transitory data storage medium, wherein the computer hardware processor is to execute specific computer-executable instructions to at least:

receive an input image of a first object;

apply a first machine learning model to first input based at least in part on the input image, wherein the first machine learning model outputs a set of layered depth images, wherein a first layered depth image from the set of layered depth images comprises a first set of pixels organized in at least a first layer from a first reference viewpoint, and wherein a second layered depth image from the set of layered depth images comprises a second set of pixels organized in at least a second layer from a second reference viewpoint;

determine an updated set of layered depth images from the set of layered depth images, wherein to determine the updated set of layered depth images, the computer hardware processor is to execute the specific computer-executable instructions to at least:

execute an upsampling process on the set of layered depth images that outputs a second set of layered depth images, wherein a layered depth image from the second set of layered depth images has a higher resolution than the first layered depth image:

apply a smoothing model to second input based at least in part on the layered depth image from the second set of layered depth images, wherein the smoothing model outputs a third layered depth image; and fuse the third layered depth image and at least one other layered depth image that results in the updated set of layered depth images; and generate a three-dimensional model based at least in part on the updated set of layered depth images.

12. The system of claim 11, wherein the computer hardware processor is to execute further computer-executable instructions to at least:

receive a training three-dimensional model of a training object;

generate a set of training layered depth images based at least in part on the training three-dimensional model; and train an initial machine learning model with training data comprising image data for the training object and the set of training layered depth images, wherein to train the initial machine learning model, the computer hardware processor is to execute the further computer-executable instructions to at least:

determine a first loss and a first gradient of a first neural network; and update, based at least in part on the first loss and the first gradient, a first weight or a first bias of the first neural network that results in the first machine learning model.

13. The system of claim 12, wherein the computer hardware processor is to execute additional computer-executable instructions to at least:

render, in a camera, the three-dimensional model, wherein the camera outputs an output image;

determine a second loss and a second gradient of a second neural network, wherein to determine the second loss and the second gradient, the computer hardware processor executes the additional computer-executable instructions to at least:

compare the input image and the output image; and update, based at least in part on the second loss and the second gradient, a second weight or a second bias of the second neural network that results in an updated machine learning model.

14. The system of claim 13, wherein a first type associated with the first object is different from a second type associated with the training object.

15. The system of claim 11, wherein the computer hardware processor is to execute further computer-executable instructions to at least:

generate a point cloud based at least in part on the set of layered depth images, wherein the three-dimensional model is generated from a surface reconstruction performed on the point cloud.

16. The system of claim 15, wherein the surface reconstruction performed on the point cloud comprises a screened Poisson surface reconstruction that outputs a mesh.

17. The system of claim 16, wherein the first machine learning model further outputs texture data, and wherein to generate the three-dimensional model, the computer hardware processor is to execute additional computer-executable instructions to at least apply a texture to the mesh based at least in part on the texture data.

18. The system of claim 11, wherein the first machine learning model corresponds to at least one of a diffusion model or a generative adversarial network.

\* \* \* \* \*